US010259928B2

(12) United States Patent
Gaston

(10) Patent No.: US 10,259,928 B2
(45) Date of Patent: Apr. 16, 2019

(54) SILANE GROUP-CONTAINING POLYMER COMPOSITION AND COATINGS CONTAINING SAME

(71) Applicant: OMNOVA Solutions Inc., Fairlawn, OH (US)

(72) Inventor: James H. Gaston, Chester, SC (US)

(73) Assignee: Omnova Solutions Inc., Beachwood, OH (US)

( * ) Notice: Subject to any disclaimer, the term of this patent is extended or adjusted under 35 U.S.C. 154(b) by 0 days.

(21) Appl. No.: 14/374,493

(22) PCT Filed: Jan. 24, 2013

(86) PCT No.: PCT/US2013/022888
§ 371 (c)(1),
(2) Date: Jul. 24, 2014

(87) PCT Pub. No.: WO2013/112683
PCT Pub. Date: Aug. 1, 2013

(65) Prior Publication Data
US 2015/0018472 A1    Jan. 15, 2015

Related U.S. Application Data

(60) Provisional application No. 61/590,545, filed on Jan. 25, 2012.

(51) Int. Cl.
| | |
|---|---|
| *C09D 135/06* | (2006.01) |
| *C09D 143/04* | (2006.01) |
| *C08K 5/04* | (2006.01) |
| *C09D 109/06* | (2006.01) |
| *C08L 35/06* | (2006.01) |
| *C08L 91/06* | (2006.01) |
| *C09D 125/08* | (2006.01) |
| *C08L 43/04* | (2006.01) |
| *C09G 1/10* | (2006.01) |
| *C08K 5/5425* | (2006.01) |
| *C08K 5/5419* | (2006.01) |
| *C08K 5/5415* | (2006.01) |

(52) U.S. Cl.
CPC .............. *C08K 5/04* (2013.01); *C08L 35/06* (2013.01); *C08L 43/04* (2013.01); *C08L 91/06* (2013.01); *C09D 109/06* (2013.01); *C09D 125/08* (2013.01); *C09D 135/06* (2013.01); *C09D 143/04* (2013.01); *C09G 1/10* (2013.01); *C08K 5/5415* (2013.01); *C08K 5/5419* (2013.01); *C08K 5/5425* (2013.01); *C08L 2666/44* (2013.01)

(58) Field of Classification Search
CPC .. C09D 135/06; C09D 109/06; C09D 125/04; C09D 125/08; C08K 5/5415; C08K 5/5419; C08K 5/5425; C08L 255/62; C08L 91/06; C08L 2666/44; C08L 43/04; C08L 35/06

See application file for complete search history.

(56) References Cited

U.S. PATENT DOCUMENTS

| | | | |
|---|---|---|---|
| 3,328,325 A | 6/1967 | Zdanowski | |
| 3,467,610 A | 3/1969 | Fiarman et al. | |
| 3,554,790 A | 1/1971 | Gehman et al. | |
| 3,573,239 A | 3/1971 | Zdanowski | |
| 3,573,329 A | 3/1971 | Lynn | |
| 3,711,436 A | 1/1973 | Oliver et al. | |
| 3,808,036 A | 4/1974 | Zdanowski | |
| 4,150,005 A | 4/1979 | Gehman et al. | |
| 4,517,330 A | 5/1985 | Zdanowski et al. | |
| 5,115,014 A * | 5/1992 | Wakabayashi et al. | 524/506 |
| 5,149,745 A | 9/1992 | Owens et al. | |
| 5,166,259 A | 11/1992 | Schmeing et al. | |
| 5,250,609 A * | 10/1993 | Kato et al. | 524/560 |
| 5,319,018 A | 6/1994 | Owens et al. | |
| 5,385,975 A | 1/1995 | Nakamura et al. | |
| 5,428,107 A | 6/1995 | Tysak et al. | |
| 5,574,090 A | 11/1996 | Gray et al. | |
| 5,676,741 A | 10/1997 | Gray et al. | |
| 5,719,234 A | 2/1998 | Yabuta et al. | |
| 6,228,913 B1 | 5/2001 | Owens et al. | |
| 6,410,634 B2 * | 6/2002 | Rufus | C09G 1/04 524/430 |
| 6,425,978 B1 | 7/2002 | Diehl et al. | |
| 6,528,590 B1 * | 3/2003 | Beyer | C08F 20/12 524/561 |
| 6,660,828 B2 | 12/2003 | Thomas et al. | |
| 6,875,834 B2 | 4/2005 | Gray et al. | |
| 7,022,801 B2 | 4/2006 | Medsker | |
| 8,124,255 B2 | 2/2012 | Okawa et al. | |
| 2004/0068035 A1 * | 4/2004 | Paiva et al. | 524/431 |
| 2004/0185269 A1 * | 9/2004 | Loper et al. | 428/447 |
| 2004/0198880 A1 * | 10/2004 | Ouchi | C09G 1/16 524/236 |
| 2005/0215678 A1 | 9/2005 | Ludtke et al. | |
| 2007/0282046 A1 * | 12/2007 | Killilea et al. | 524/261 |
| 2009/0035587 A1 * | 2/2009 | Killilea | C08F 220/18 428/447 |
| 2009/0324936 A1 * | 12/2009 | Kim | C08F 36/04 428/335 |
| 2010/0015457 A1 | 1/2010 | Johnson et al. | |
| 2012/0157595 A1 | 6/2012 | Gaston | |

FOREIGN PATENT DOCUMENTS

| | | | | |
|---|---|---|---|---|
| GB | 813947 A * | 5/1959 | | C08L 25/04 |
| JP | S55-110170 | 8/1980 | | |

(Continued)

OTHER PUBLICATIONS

JP S55 -110170A, Aug. 1980, Partial English Translation.*

(Continued)

*Primary Examiner* — Satya B Sastri
(74) *Attorney, Agent, or Firm* — Kagan Binder, PLLC

(57) ABSTRACT

Compositions that include polymer and silane can be used in various finish compositions, especially finish compositions intended for use on hard, high gloss surfaces. The silane of the composition can be in the form of a silane group attached to a polymer backbone or as a distinct component. The polymer can be provided as an aqueous emulsion or suspension in a liquid. The polymer finish composition can be used as a floor care coating or as an architectural coating such as a paint or wood finish.

11 Claims, No Drawings

(56) References Cited

FOREIGN PATENT DOCUMENTS

| JP | S60-219274 | 11/1985 |
| JP | S62-161876 | 7/1987 |
| JP | S62-250078 | 10/1987 |
| JP | S63-130684 | 6/1988 |
| JP | 04-057868 | 2/1992 |
| JP | 04-225065 | 8/1992 |
| JP | 2000-239614 | 9/2000 |
| JP | 3186278 B2 | 7/2001 |
| JP | 2004-231917 | 8/2004 |

OTHER PUBLICATIONS

JP 63-130684A, Jun. 1988, Partial English Translation.*
Supplementary EP Search Report, EP 13740766, dated Jul. 20, 2015, pp. 1-5.
Notification of Reexamination for Chinese Patent Application No. 201380012345.2 dated Jan. 24, 2019, 7 pages, translation.
Notification of Reason for Rejection for Japanese Patent Application No. 2018-072092 dated Dec. 10, 2018, 10 pages with translation.
Notification of Reason for Rejection for Japanese Patent Application No. 2014-554816 dated Nov. 19, 2018, 33 pages with translation.
Notification of Reexamination for Chinese Patent Application No. 201380012345.2 dated Jan. 24, 2019, 5 pages with no translation.

* cited by examiner

SILANE GROUP-CONTAINING POLYMER COMPOSITION AND COATINGS CONTAINING SAME

CROSS-REFERENCE TO RELATED APPLICATION

This application claims the benefit from International No. PCT/US2013/022888, filed Jan. 24, 2013, which in turns claims priority to and the benefit of U.S. Provisional patent application No. 61/590,545, filed 25 Jan. 2012, the disclosures of which are incorporated herein by reference in their entireties.

BACKGROUND INFORMATION

Polymeric coatings are used in paints, wood finishes, printed surfaces, photographs, floor care products, waxes, polishes, and the like, to coat and protect surfaces, regardless of orientation (e.g., vertical, horizontal, or otherwise).

Most floor care products require periodic application of a polymer-containing liquid floor care composition, which dries to a protective polymeric finish. The floor care composition is applied to a floor surface and allowed to form a film (coalesce) as the carrying solvent evaporates. Film formation desirably can occur at room temperature and the resulting film desirably can be removed if damaged or compromised. Good protective finishes exhibit resistance to scratching and scuffing, resistance to marking from shoes, resistance to liquids (including water), strong adhesion to the substrate, good gloss and transparency (e.g., lack of hazing) and the like.

A polymer composition capable of forming a polymeric coating can be in the form of one or more solid polymer materials dissolved, dispersed, or suspended in an organic or aqueous liquid. Many polymers used in floor polishes are developed or tailored to adhere to and protect artificial flooring substrates such as those made of synthetic materials such as PVC. Floor coatings that adhere to and protect not only such synthetic flooring materials but also cementitious surfaces including decorative concrete and terrazzo and other hard surfaces such as ceramic and porcelain tiles, natural and cultured stone, cement, marble, granite, and the like have strong commercial demand. Accordingly, polymeric floor care products are needed to protect and enhance appearances of these types of hard floor surfaces.

Upon application to such a surface, polymer finish compositions desirably produce a high gloss protective coating that is desirably durable, exhibits good adhesion to the substrate, and is free of deleterious cosmetic features such as haze. Unfortunately, application of many standard floor polish coatings to hard, high gloss surfaces such as granite, marble, and the like, results in dried coatings that tend to be hazy, possibly due to surfactant migration or poor adhesion, and that often exhibit unacceptable abrasion resistance, hardness, and/or adhesion.

Floor polish compositions often include one or more film-forming polymers dissolved, dispersed, suspended, etc., in a liquid medium. Although organic solvents can be used, water is the liquid medium of choice in most currently commercial polymer compositions. Because many polymers are insoluble in water, aqueous floor polish compositions must include one or more surfactants to keep the polymer particles dispersed or suspended. Other common ingredients include one or more crosslinking agents that can reversibly crosslink the polymer chains from which the protective film is formed, one or more material designed to aid in the flow, wetting, or leveling of the composition across the floor surface, one or more coalescents, plasticizers, and waxes.

Many types of polymers have been used in the manufacture of floor polish compositions and other polymeric compositions such as waxes, polishes, paints, wood finishes, and the like. Many such polymers include mer that include pendent aromaticity, e.g., vinyl aromatic mer and/or mer derived from one or more acrylic-type monomers. Floor polishes based on a styrene-butadiene interpolymers are described in U.S. Pat. No. 8,124,225 and U.S. Pat. Publ. No. 2012/0157595.

SUMMARY

The following description relates to compositions that include polymer and silane. The silane may be in the form of a silane group attached to a polymer backbone or as a distinct component. The polymer can be provided as a latex, i.e., a polymer emulsion or suspension in a liquid, particularly water. The composition can be used in various finish compositions, especially finish compositions intended for use on hard, high gloss surfaces. Much of the present description relates specifically to polymer finish compositions that are useful as floor care compositions, especially for use with hard, high gloss substrates, although the described polymer compositions that contain polymer and silane are contemplated to be useful in other polymer finish compositions, particularly architectural coatings such as paints, wood finishes, non-floor waxes, polishes, and the like.

The polymer composition may be in any form such as a liquid solution, suspension, dispersion, water-based, solvent-based, etc. A polymer composition may be useful by itself, may be combined with added ingredients (hereinafter "additives") to produce a derivative such as a polymer finish composition, and may be used in methods that include processing to produce a dried or cured polymer coating on a surface of a substrate. Examples of uses for a polymer composition or a polymer finish composition include floor care compositions, paints, wood finishes, waxes, polishes, and the like useful for application to and protection of surfaces including floors, walls, furniture, or other vertical or horizontal surfaces, especially floor care compositions that are useful on general or specific types of hard, typically horizontal, high gloss substrate.

The polymeric component of the polymer composition can include mer resulting from incorporation of ethylenically unsaturated compounds such as vinyl aromatics, polyenes such as butadiene, and acids or esters such as various (meth)acrylic acids and (meth)acrylates such as alkyl(alk)acrylates. Exemplary polymers include those made from monomers including styrene and polyene as well as those made from monomers including styrene and acids/esters, as well as other monomers known to be useful in polymer finish compositions. Preferred polymers include those made from monomers that include a vinyl aromatic compound such as styrene and a di-functional monomer that can include a reactive acid or vinyl compound. Exemplary such polymers made from styrene and polyene (e.g., butadiene), and polymers made of styrene and an acid monomer (e.g., an acrylic acid or (meth)acrylic acid monomer), include a backbone and pendent a pendent reactive group that is capable of reacting with the reactive silane compound; e.g., a reactive acid (e.g., a carboxylic acid), vinyl, epoxy, or hydroxy group. Preferred reactive silane compounds include a silane group and a reactive group that is capable of reacting with the reactive group of the polymer, such as a hydrolyzable group such as a vinyl, epoxy, or hydroxy.

A polymer composition according to the present description contemplates various forms of polymer and silane. It can refer to a composition that includes a silane-free polymer and a reactive silane compound, with the latter becoming grafted to the silane-free polymer to produce a silane-containing polymer. It also can refer to a composition that includes a silane-containing polymer such as one that includes mer resulting from incorporation of silane-containing monomer(s) and silane-free monomers, typically both types of such mer being located in the polymer backbone. Thus, embodiments of the polymer compositions include those that include polymer that does not contain any silane groups in combination with a silane compound, for example a composition that includes a blend or mixture of polymer and a reactive silane compound, optionally in solution or in the form of an emulsion, suspension, or other form of polymer composition. Other embodiments include a polymer composition that includes polymer with attached silane groups, referred to herein as a silane-containing polymer. The silane-containing polymer can include any polymeric backbone, especially a synthetic polymer backbone of the type used in polymeric floor care compositions. Exemplary backbone polymers include those made from monomers that include a reactive aromatic compound such as styrene, and a di-functional monomer that can include a reactive acid or vinyl compound. Exemplary such polymers made from styrene and polyene (e.g., butadiene), and polymers made of styrene and an acid monomer (e.g., an acrylic acid or (meth)acrylic acid monomer).

Embodiments of a polymer composition or derivative thereof according to the following description can exhibit improved (e.g., reduced) viscosity properties, which aid in application, and/or advantageous mechanical and cosmetic properties such as adhesion, abrasion resistance (e.g., as measured by a wet scrub test), solvent resistance, and reduced haze.

In one aspect is provided a floor care composition that contains a polymer composition that includes polymer, silane, wax, and a liquid.

In another aspect is provided a polymer that includes vinyl aromatic mer and pendent silane group(s) carried in a liquid. The silane-containing polymer can be provided by a method that includes reacting monomers that include a vinyl aromatic, an ethylenically unsaturated acid, a $C_1$-$C_{20}$ alkyl (meth)acrylate, and a reactive silane compound. The silane-containing polymer also can be provided by a method that includes reacting monomers that include a vinyl aromatic, an ethylenically unsaturated acid, and a $C_1$-$C_{20}$ alkyl(meth) acrylate to provide a polymer backbone and then reacting a reactive silane compound with the backbone to provide a polymer that includes pendent silane groups.

In another aspect, the invention relates to a method of providing a polymer finish composition in which a polymer composition that includes polymer and silane is combined with additional ingredients.

Other aspects of the present invention will be apparent to the ordinarily skilled artisan from the detailed description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetra-polymers, and the like;

"polyene" means a molecule with at least two double bonds located in the longest portion or chain thereof, and specifically is inclusive of dienes, trienes, and the like;

"aqueous" refers to any liquid blend or mixture that includes water as a component; and "external surfactant" means a surface active agent that is added directly to a composition and is not present as a result of being a component of another ingredient of the composition.

Throughout this document, unless the surrounding text explicitly indicates a contrary intention, all values given in the form of percentages are weight percentages, and all descriptions of minimum and maximum values for a given property further include ranges formed from each combination of individual minimum and individual maximum values.

The relevant teachings of all patent documents mentioned throughout are incorporated herein by reference.

DETAILED DESCRIPTION OF ILLUSTRATIVE EMBODIMENTS

As described summarily above, the subject polymer compositions contain a polymer and a silane. The polymer compositions can be used to provide derivative compositions that include but are not limited to polymer finish compositions.

The polymer and silane of the polymer composition can be dissolved, dispersed, suspended, or otherwise entrained in a liquid such as water, an organic solvent, or a combination thereof; the liquid can be an aqueous medium where water constitutes at least 50 weight percent, greater than 80 weight percent, or even greater than 90 or 95 weight percent water of the liquid medium. In certain embodiments, the polymer composition is present as a solid and is the only solid material present in the liquid. The polymer composition optionally can contain other ingredients such as solvent, additional polymer(s), as well as any of a variety of additives.

The polymeric component of the polymer composition can include pendent silane groups, with such polymers sometimes referred to herein as a silane-containing polymers. In other polymer compositions, the polymeric component does not include attached pendent silane groups, with such polymers sometimes referred to herein as a silane-free polymers, but is blended, mixed, or otherwise combined with a distinct silane that optionally, but preferably, can have a functional group capable of reacting with the polymer so that reaction between the polymer and reactive silane compound results, at some point, in a silane-containing polymer.

The backbone of the polymeric component of the polymer composition preferably is free of Si—O bonds and is at least substantially free of ethylenic unsaturation, i.e., in-chain double bonds. Preferred polymers include pendent reactive groups such as carboxyl functionality.

Examples of polymers that have been or can be used to provide a film-forming composition include but are not limited to polyacrylates, styrene-butadiene interpolymers, styrene-acrylate interpolymers, polyurethanes (e.g., aqueous polyurethane resin comprising polyurethane polymer that includes a bonded carboxylic acid or carboxylate group) and acrylic polymers. An acrylic polymer is one that includes mer derived from ethylenically unsaturated acids or alkyl esters thereof (i.e., "acidic mer").

Many of the foregoing types of polymers have been used in a variety of a polymer finish compositions including paints, floor care compositions and wood finishes. Certain exemplary polymers that can be used include, but are not limited to, those which include

- up to 70%, commonly ~10 to ~50%, vinyl aromatic mer such as can result from inclusion of at least one of styrene, any of a variety of halogenated styrenic monomers, vinyl toluene, o- or p-methoxy styrene, allyl phenyl ether, allyl tolyl ether, and α-methyl styrene;
- from ~3 to ~50%, commonly ~5 to 20%, mer derived from at least one ethylenically unsaturated acid such as maleic acid, fumaric acid, cinnamic acid, aconitic acid, crotonic acid, citraconic acid, acryloxypropionic acid, (meth)acrylic acid, itaconic acid, and partial esters of those of the foregoing which are polyacids;
- from ~30 to ~97%, commonly ~35 to ~70%, mer derived from $C_1$-$C_{20}$, preferably $C_1$-$C_{12}$, alkyl(meth)acrylates such as methyl(meth)acrylate, ethyl(meth)acrylate, n-butyl(meth)acrylate, isobutyl(meth)acrylate, 2-ethyl hexyl acrylate, n-octyl acrylate, sec-butyl acrylate, cyclopropyl methacrylate, any of a variety of acetoacetoxyalkyl(meth)acrylates, 2,3-di(acetoacetoxy)propyl (meth)acrylate, and the like;
- optionally up to 40% mer derived from at least one polar or polarizable nonionogenic hydrophilic monomer such as (meth)acrylonitrile, crotononitrile, α-cyanostyrene, α-chloroacrylonitrile, ethyl vinyl ether, isopropyl vinyl ether, isobutyl- and butyl-vinyl ether, diethylene glycol vinyl ether, decyl vinyl ether, vinyl acetate, isobornyl methacrylate, hydroxyalkyl(meth)-acrylates such as 2-hydroxyethyl(meth)acrylate, 2- or 3-hydroxypropyl (meth)acrylate, butanediol acrylate, and 3-chloro-2-hydroxypropyl acrylate, as well as vinyl thiols such as 2-mercaptopropyl methacrylate, 2-sulfoethyl methacrylate, methyl vinyl thiol ether and propyl vinyl thio-ether; and
- optionally up to 10% mer derived from at least one monomeric vinyl ester in which the acid moiety of the ester results from aromatic $C_1$-$C_{18}$ aliphatic acids such as formic, acetic, propionic, n-butyric, n-valeric, palmitic, stearic, phenyl acetic, benzoic, chloroacetic, dichloroacetic, γ-chloro butyric, 4-chlorobenzoic, 2,5-dimethyl benzoic, o-toluic, 2,4,5-trimethoxy benzoic, cyclobutane carboxylic, cyclohexane carboxylic, 1-(p-methoxy phenyl)cyclohexane carboxylic, 1-(p-tolyl)-1-cyclopentane carboxylic, hexanoic, myristic, and p-toluic acids.

The relative amounts of mer may be approximated by the amounts of respective monomers used when the polymerization process conditions permit substantially complete conversion; accordingly, all of the foregoing percentages can be understood to be mole percents.

Also useful as a polymer as described (optionally a silane-containing polymer, which includes a silane pendent group) are polyene interpolymers of the types described in the aforementioned U.S. Pat. No. 8,124,225. In addition to the types of mer included in the acrylic polymers described immediately above, these interpolymers include from ~5 to ~50%, commonly from ~10 to ~40%, and more commonly from ~20 to ~35% polyene mer, typically resulting from inclusion of conjugated diene mer such as from 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and the like. A styrene-butadiene interpolymer can include relatively higher amounts of vinyl aromatic mer, e.g., up to ~75% or even 80%. When these interpolymers include acidic mer, which can result from inclusion of versatic acid in addition to the acidic monomers described above, a floor care composition incorporating the polymer can exhibit good durability, black heel mark resistance, and good water resistance. These interpolymers also can include up to ~10% mer derived from functional monomers that help to control the hydrophilic-hydrophobic properties of the polymer, improve the compatibility of the polymer with one or more additives, and/or affect hydrogen bonding with acid functionality in the polymer; examples of such functional monomers include 2-hydroxyethyl(meth)acrylate, n-methylol(meth)acrylamide, (meth)acrylamide, and the like.

The foregoing types of polymers can be prepared by emulsion techniques such as those generally described in U.S. Pat. Nos. 3,573,239, 3,328,325, 3,554,790, 3,467,610, 5,166,259, and 6,425,978. These types of polymerization processes use up to ~5% of one or more so-called internal surfactants. Examples of potentially useful internal surfactants include one or more of the following: salts of alkyl sulfosuccinates such as sodium dihexyl sulfosuccinate and sodium dioctyl sulfosuccinate; salts of alkyl sulfates such as sodium lauryl sulfate; salts of organo disulfonates such as dodecyl diphenyloxide disulfonate; sodium laureth sulfate; sodium lauryl ether sulfate; sodium laureth-12 sulfate; sodium laureth-30 sulfate; sodium dodecyl benzene sulfonate; and organophosphates such as those described in U.S. Pat. Publ. No. 2005/0215678. If desired, the emulsion polymerization mixture can include a plasticizer and/or coalescing agent, the inclusion of which can lower film formation temperature of the latex composition by up to 10°-20° C. The emulsion polymerization mixture also can include, based on the total weight of monomers, up to ~2% of an internal crosslinking agent such as divinylbenzene and any of a variety of functional di- and tri-(meth)acrylates and/or up to ~3% of a chain transfer agent.

In certain particularly preferred embodiments, a polymer backbone can include the following: from 10 to 50% vinyl aromatic mer, from 3 to 25% acidic mer, and from 10 to 80% $C_1$-$C_{20}$ alkyl(meth)acrylate mer. As discussed more fully below, a useful amount of silane functionality can be incorporated by including from about 0.1 to 10 weight percent silane mer in the polymer backbone.

The silane may be attached to the polymer as a group (i.e., a silane-containing polymer) or may be a separate component in the form of a distinct, reactive silane compound.

In a silane-containing polymer, useful silane groups include those represented by the formula —Si($R^1$)$_3$ where each $R^1$ independently is a hydrogen atom, an alkoxy group, or an alkyl group. Certain preferred silane groups are those where each $R^1$ independently is a straight-chain $C_1$-$C_5$ alkyl or alkoxy group. Preferred among these are those silane group where each $R^1$ independently is a $C_1$-$C_5$ alkoxy group (commonly a $C_1$-$C_3$ alkoxy, typically a methoxy or ethoxy, group).

One or more of the silane groups of a silane-containing polymer can be connected indirectly to the backbone of the silane-containing polymer through a divalent linking group such as a —R²—, —OR²— or —R²O— moiety where R² is a C₁-C₁₅, preferably C₁-C₁₀, alkylene group.

Silane-containing polymers can include mer derived from a silane monomer, i.e., a compound that contains a silane group and a polymerizable group such as an epoxy, vinyl, (meth)acrylate, etc., with examples of silane monomer including any of the reactive silane compounds described generally or specifically herein, such as 3-methacryloxypropyltrimethoxysilane, vinyltrimethoxysilane, vinyltriethoxysilane, β-(3,4-epoxycyclohexyl) ethyltriethoxysilane, 3-glycidoxypropyltrimethoxysilane, and combinations thereof.

A silane-containing polymer also can be prepared by grafting silane group-containing compounds onto a silane-free polymer. For example, a silane-free polymer that includes reactive groups, such as carboxylic acid groups, can react with the reactive group of a reactive silane compound. Examples of useful acid-functional, silane-free polymers, and their methods of preparation, are described herein and include film-forming acrylic polymers, styrene-butadiene interpolymers, polyurethanes (e.g., aqueous polyurethane polymer that includes a bonded carboxylic acid or carboxylate group), and the like.

Reactive silane compounds generally include a silane group and a separate functional group that can react with an acid, vinyl, or other reactive group of a silane-free polymer (e.g., a vinyl, epoxy, amine, etc., group). Useful reactive silane compounds can represented by the general formula Z—X—Si(R¹)₃ where Z is a reactive functional group, R¹ is as defined above, and X is a divalent linking group, preferably a —R²—, —OR²— or —R²O— moiety where R² is as defined above. Certain non-limiting examples of reactive silane compounds include vinyltrialkoxysilanes such as vinyltrimethoxysilane and vinyltriethoxysilane, β-(3,4-epoxycyclohexyl)ethyltriethoxysilane, 3-glycidoxypropyltrimethoxysilane, and 3-methacryloxypropyltrimethoxysilane.

In preparing a silane-containing polymer by reacting a reactive silane compound with a reactive group of a silane-free polymer, the relative amount of reactive silane compound reacted onto the backbone of the silane-free polymer can vary widely. According to certain useful embodiments, the amount generally can range from ~0.1 to 10 parts by weight (pbw) reactive silane compound per 99.9 to 90 pbw silane-free polymer, commonly from ~0.2 to 5 pbw reactive silane compound per 99.8 to 95 pbw silane-free polymer, typically from 0.2 to 4 pbw reactive silane compound per 99.8 to 97.5 pbw silane-free polymer.

Silane-containing polymers, regardless of how prepared, can have a glass transition temperature of at least 10° C., at least ~20° C., at least ~30° C., or at least ~40° C., and as high as 100° C., commonly as high as ~80° C., more commonly as high as ~70° C., and even more commonly as high as ~60° C. The T$_g$ of a given polymer may be determined by DSC tests performed on dried films made from the polymer or can be estimated from the Fox equation.

A blend or mixture of separate ingredients that include a silane-free polymer and a distinct silane compound also can constitute a polymer composition. The silane compound preferably includes a polymer reactive group in addition to its silane group. Exemplary reactive groups are the same as those mentioned previously in connection with the grafted polymer option. Useful silane compounds can represented by the general formula Z—X—Si(R¹)₃ where Z, R¹, and X are defined as above.

In polymer composition embodiments that include silane-free polymer and silane compound, the amount of reactive silane compound can be any that is capable of producing a dried polymer coating having a desired or useful combination of mechanical and cosmetic properties. An amount of silane compound that is too low relative to the amount of polymer may not result in any added utility due to the silane. An amount of silane compound that is too high relative to the amount of polymer may result in undesired properties such as an increase in viscosity. Examples of general amounts can be in a range from ~0.1 to 10 pbw reactive silane compound per 99.9 to 90 pbw silane-free polymer, more preferably from ~0.2 to 5 pbw reactive silane compound per 99.8 to 95 pbw silane-free polymer, such as from 0.2 to 4 pbw reactive silane compound per 99.8 to 97.5 pbw silane-free polymer. In certain embodiments, amounts in a range from ~0.5 to ~1.5 pbw reactive silane compound per 98.5 to 99.5 pbw polymers solids, have been found to be particularly useful.

Polymer of a polymer composition as described, e.g., silane-containing polymer or silane-free polymer, can be in the form of water insoluble (e.g., dispersed or suspended) particles provided as part of a liquid polymer composition. Commonly, the polymer can be in the form of solid polymer particles dispersed or suspended within a liquid medium such as a continuous aqueous phase; this form of a latex may be considered an emulsion, a dispersion, or the like. The dynamic viscosity of the polymer, regardless of whether silane-containing or silane-free, in a latex form generally is less than ~0.25 Pa·s (250 cP) (measured using a Brookfield™ model LV viscometer using a #1 spindle at 1 rotation per second), with exemplary values being below about 100 centipoise.

Polymer particles optionally can include compositionally distinct regions, e.g., core-shell architecture, or can be substantially homogeneous. Average or mean diameters of polymer particles can typically be less than ~140 nm, generally less than ~100 nm, commonly less than ~90 nm, and often less than ~80 nm, although rarely less than ~70 nm. (Particle size can be given as an average determined by capillary hydrodynamic fractionation, a chromatographic method in which particles of varying sizes elute at different times from a narrow-bore capillary column.) Particle size distribution generally is less than 2.0, commonly less than 1.5, more commonly less than 1.1, and preferably on the order of ~1.05. Polymer particles can display essentially any gel content value, although common values range from ~50-90%. The polymer content of the latex may be any amount, for example an amount in a range from ~30 to ~55 weight percent polymer solids based on the total weight of the latex, although higher amounts can be achieved in certain circumstances.

A polymer composition described as having solids that "consist of" polymer and silane has solids that include only polymer and silane (e.g., silane-containing polymer, or silane-free polymer and a separate silane compound), optionally with small amounts of other solid ingredients used to prepare the polymer such as non-polymer by-products of a polymerization reaction; solid ingredients useful or appurtenant to preparation of a polymer such as monomer, chain transfer agent (e.g., up to ~3 weight percent based on total weight of monomers), internal surfactant (commonly used at up to ~5 weight percent surfactant based on the amount of polymer); catalyst; plasticizer; coalescing agent (coalescent); internal crosslinking agent (e.g., used at up to ~3 weight percent); and any other polymerization or processing aids, if used.

A polymer composition described as having solids that "consist essentially of" polymer and silane is a composition such as the one described in the preceding paragraph, optionally with small amounts (e.g., less than 5 percent based on the total weight of silane-containing polymer) of any single ingredient or combination of ingredients added to improve a polymer composition or to prepare a polymer finish composition, e.g., a floor care composition, many general and specific examples of which are described herein.

The polymer composition can be aqueous, such as an aqueous emulsion or dispersion that includes solid particles which include polymer (e.g., silane-free polymer, silane-containing polymer, or both), dispersed in a continuous aqueous phase. The total amount of solids (e.g., total solids by weight) can be any useful amount, for example from 30 to 60 weight percent total solids, from 35 to 55 weight percent total solids, or from 38 to 45 weight percent total solids, based on the total weight of the polymer composition. According to certain embodiments of these types of polymer compositions, the solids content of the composition may consist of or consist essentially of the described polymer and silane (e.g., silane-containing polymer, or silane-free polymer in combination with reactive silane compound).

As part of the total solids, a polymer composition can contain any desired or useful amount of polymer solids, e.g., relative to total solids of a polymer composition. Exemplary amounts of polymer solids relative to total solids in a polymer composition can be an amount of polymer in the range from 70 weight percent to 98 weight percent polymer per total weight solids of a polymer composition, e.g., from 75 to 98 weight percent per total weight solids. The remaining up to 25 or 30 weight percent solids can be made up of other useful solid materials such as reactive silane compound (if present), materials used in or remaining from a process of producing a polymer (e.g., silane-containing polymer or silane-free polymer), or materials used to prepare a derivative polymer finish composition. (In this context, and unless specifically indicated otherwise herein, weight percent polymer refers to only polymer material and not to solid materials used to prepare the polymer or solid materials that are by-products of a polymerization reaction, if present).

Certain preferred polymer finish compositions can be emulsions or dispersions that include discontinuous particles of polymer (optionally, also, reactive silane compound) dispersed or suspended in a continuous liquid phase, and added ingredients desired in a polymer finish composition. The relative amounts of liquid medium of a continuous liquid phase (e.g., aqueous phase) and solids (polymer, silane compound if present, and other optional solid added ingredients if present) in a polymer finish composition can be any useful amounts, for example an amount of liquid medium (e.g., water, organic solvent, or a blend of these) to produce a composition that includes from 5 to 40 weight percent total solids (per total weight polymer finish composition), alternately from 10 to 30 weight percent total solids, or from 12 to 25 weight percent total solids.

A polymer finish composition derived from polymer composition by blending additives into the polymer composition will include solids present from the starting polymer composition, and solids from the added ingredients. Exemplary amounts of solids present due to their presence in a starting polymer composition relative to a total amount solids in a polymer finish composition (the amount of solids of the polymer composition in addition to the "added ingredients") can be an amount of solids in the range of from 70 to 92 weight percent solids present as a portion of the polymer composition, per total weight solids of a polymer finish composition, e.g., from 80 to 90 weight percent solids present as a portion of the polymer composition per total weight solids in a polymer finish composition. In such embodiments, the remaining 8 to 30 or 10 to 20 weight percent solids can be made up of added solid materials, e.g., from "added ingredients," added to the polymer composition to produce the polymer finish composition as described herein, including amounts of surfactant, defoamer, leveling agent, etc.

A polymer composition as described, containing polymer and silane, can be combined with added ingredients to produce a "polymer finish composition," which includes polymer, optional reactive silane compound, and one or more added ingredient or ingredients to result in a derivative composition having specific utility such as a paint, a wax, a polish, floor care composition, wood finish, or other coating product. Examples of specific types of polymer finish compositions include floor care compositions, waxes, polishes, wood finish products, photographic and printing coatings, paints, glass (window or lens) coatings, and the like. A polymer finish composition can include amounts of polymer, silane (e.g., reactive silane compound or a pendent silane group), and other solid or liquid ingredients that can be useful in any one or more of these or other coating applications. Exemplary additives are those which produce a desired physical property or effect in a polymer finish composition or dried derivative thereof, such as a film-forming property, a leveling property, chemical or physical (e.g., mechanical) stability of a composition, chemical reactivity upon cure or drying, compatibility between ingredients, viscosity, color, durability, hardness, finish (e.g. high gloss or matte finish), or another mechanical or aesthetic property, etc. Examples of added ingredients useful to achieve a desired effect can include surfactant, pigment, leveling agent, stabilizer, crosslinkers, catalysts, antifoam agents, wax, plasticizers, coalescents, antimicrobial agents or other preservatives, and the like.

An example of a polymer finish composition is a floor care composition, which can include useful amounts of polymer and silane, as described above, and further may contain any one or more added ingredients including surfactant (which may be any of various known types including anionic, ionic, nonioinic, etc.), plasticizer, wax, defoamer, preservative, combinations of these, or other added ingredients.

A typical floor care composition can be characterized as a suspension or dispersion of solid particles (comprising polymer) in a liquid medium, preferably a continuous aqueous phase that includes a major amount of water, or mostly water, preferably entirely water (see discussions of solvent blends, herein). Exemplary descriptions of such compositions and their production can be found in U.S. Pat. Nos. 3,328,325, 3,467,610, 3,554,790, 3,573,329, 3,711,436, 3,808,036, 4,150,005, 4,517,330, 5,149,745, 5,319,018, 5,574,090, 5,676,741 and 6,228,913, as well as subsequent patent documents citing these. Examples of suitable polymer materials useful within water- or solvent-based liquid media, that can form useful films or coatings, include, but are not limited to polymers known as acrylate polymers, styrene-butadiene polymers, polypropylenes, polyacetals, polyamides, polyesters, polystyrenes, PVC, polyvinylidene chlorides, polyurethanes, and polyureas.

The non-volatile solids content of such floor care compositions can be at least ~20%, ~18%, ~15%, or even as little as ~5%, and can be up to ~25%, ~30%, ~35%, or even ~40%. The non-volatile solids can include a minimum of ~80%, ~75%, or even ~70% synthesized polymer; in these or other embodiments, synthesized polymer can constitute up to ~85%, ~90%, ~94%, ~96%, ~98%, or even ~99% of the non-volatile solids.

Polymer finish compositions such as floor care compositions, paints, and others, are complex mixtures that use, in addition to polymer latex, a wide variety of components in widely varying amounts and types. Many known and useful materials can be mixed into a polymer composition (e.g., latex) after preparation of the polymer and before transport without deleteriously affecting storage stability or other properties. Alternately, many of the same or different materials can be mixed with a latex subsequent to manufacture and transport. A variety of important types of added ingredients (especially for floor care compositions) that can be present in these compositions are discussed in the following paragraphs. In addition to those, however, other additional components can include external surfactants, preservatives, defoamers, biocides, fragrances, dyestuffs, brighteners, antioxidants, and UV absorbing agents, among still others. As indicated, while some of the following ingredients may be useful or typical within a finished polymer composition (e.g., a floor care composition), they are not necessary according to the present description and some can be excluded from certain preferred embodiments of the described polymer compositions and floor care compositions.

One commonly used added ingredient is an external crosslinking agent, which facilitates the linking of polymer particles or chains, typically through acid functionalities. Where a bifunctional external crosslinking agent is included, the agent can react or interact with acid functionalities on two chains, thereby linking those chains and improving certain characteristics of a coating that results from the polymer finish composition. Salts or complexes of polyvalent metals (e.g., Ca, Mg, Zn, Ba, Al, Zr, Ni, Fe, Cd, Sr, Bi, Be, Co, Pb, Cu, Ti, Sb, etc.) often are used as external crosslinking agents, as is aziridine; some of the most commonly used complexes are zinc ammonium carbonate, zinc ammonium acetate, zinc ammonium acrylate, zinc ammonium maleate, zinc ammonium aminoacetate, calcium ammonium alanine, calcium ethylenediamine-ammonium carbonate, zirconium ammonium carbonate and zirconium ammonium maleate. The amount of external crosslinking agent included in a polymer finish composition can be calculated on the equivalents of acid groups within a polymer chain of a polymer of the composition. Examples of useful amounts of external crosslinking agent can be from ~0.25 to ~0.5 mole crosslinking agent per equivalent of acid group in a polymer. Although not required, external crosslinking agent can be added to the polymerization medium after formation of latex but prior to formation of a polymer finish composition (e.g., aqueous floor care composition), i.e., added to the latex composition prior to storage or shipment. According to certain preferred polymer compositions and floor care compositions, no external crosslinking agent is included.

In certain preferred embodiments of floor care compositions, an external crosslinking agent can be zinc as opposed to other useful metal crosslinking agents. Zinc (e.g., ZnO) can be present in a floor care composition in an amount per acid functionality (of the polymer) of from 0.05 mole ZnO to 0.5 mole ZnO, per equivalent of acid functionality (—COOH) in the polymer. According to certain preferred polymer compositions and floor care compositions, no zinc or other heavy metal crosslinker is present. In such compositions, amounts of zinc as a heavy metal external crosslinking agent (e.g., ZnO), or other heavy metal external crosslinking agent, can be kept to a level below ~0.05 mole heavy metal crosslinking agent per equivalent of acid functionality in the polymer, preferably below ~0.01 mole heavy metal crosslinking agent per equivalent of acid functionality in the polymer.

Another commonly used added ingredient in a polymer finish composition (e.g., floor care composition) is wax, which can affect sliding properties, durability, and black heel mark resistance of a floor coating provided from the composition. Examples of natural waxes include carnauba, paraffin, and the like, while examples of synthetic waxes include any of a variety of poly(alkylene)s and oxides thereof. Floor care compositions often contain wax, based on the total weight of nonvolatile components (solids) in a floor care composition, in amounts up to ~55 weight percent wax, commonly from ~1 to ~30 weight percent, and typically from ~5 to ~20 weight percent.

Another added ingredient that may be useful in a polymer finish composition such as a floor care composition is an alkali-soluble resin, which can affect the leveling properties of a composition. Examples of alkali-soluble resins include styrene-acrylic acid interpolymers, styrene-maleic acid interpolymers, rosin-maleic acid copolymer resins, water-soluble acrylic resins, water-soluble polyester resins, and water-soluble epoxy resins. Useful amounts of alkali-soluble resins based on total weight polymer finish composition can be amounts up to ~50% alkali-soluble resin by weight, commonly from ~1 to ~20 percent by weight, and typically from ~3 to ~10 percent by weight based on total weight polymer finish composition.

Another added ingredient that may be useful in a polymer finish composition such as a floor care composition is an aqueous polyurethane resin. An aqueous polyurethane resin can affect durability of a dried coating provided from the composition. Examples of aqueous polyurethane resins include polyurethanes that include a bonded carboxylic acid or carboxylate group. Useful amounts of aqueous polyurethane-type resins included in a polymer finish composition, based on total weight of an aqueous composition, can be up to ~80 weight percent aqueous polyurethane-type resins based on total weight polymer finish composition, commonly from ~1 to ~60 weight percent, and typically from ~20 to ~40 weight percent.

Still another added ingredient that may be useful in a polymer finish composition such as a floor care composition can be a plasticizer (or "permanent plasticizer"), which can be an ingredient that functions to reduce the minimum film-forming temperature of a polymer composition, and that does not completely volatilize during curing, meaning that plasticizer remains permanently cured in the cured polymer. Exemplary plasticizers include dialkyl phthalates, 2-pyrrolidone, octyl diphenyl phosphate, esters of benzoic acid, and tributoxyethyl phosphate. Useful amounts of plasticizer in a polymer finish composition, based on total weight polymer finish composition, can be amounts up to ~25 weight percent, commonly from ~1 to ~4 weight percent, and typically from ~2 to ~3 weight percent of the polymer finish composition.

Another added ingredient that may be useful in a polymer finish composition such as a floor care composition is a coalescent (or film-forming aid) which can assist in forming continuous films where the composition is applied at elevated temperatures. An exemplary coalescent can have the effect of lowering a minimum film forming temperature of a polymer composition that contains the coalescent, and can preferably volatilize out of the polymer composition upon formation of a film and curing. Specific examples of coalescents include alcohols such as ethanol, isopropyl alcohol, etc., as well as polyols and glycol ethers. Useful amounts of coalescent based on total weight of a polymer finish composition can be amounts up to ~10 weight percent coalescent based on total polymer finish composition, commonly from ~1 to ~7 weight percent, and typically from ~3 to ~5 weight percent.

One of the more important components that can be included in a floor care composition is one or more leveling agents or aids. Many commercial floor care compositions include polyfluorooxetanes (see, e.g., U.S. Pat. Nos. 6,660,828 and 7,022,801), nonionic surfactants, anionic surfactants, silicone-based surfactants, or fluorine-containing surfactants (e.g., DuPont Zonyl™ fluorosurfactants) as leveling aids. When used, preferred amounts of leveling agent such as a fluorosurfactant can be present in a polymer finish composition at any useful level, such as within the range from 50 to 200 parts per million.

In a non-limiting sense, certain ingredients may be useful in a polymeric floor care (finish) composition in relative amounts such as the following, based on the total weight of a polymeric floor care composition:

from 10 to 45 (e.g., from 12 to 40) pbw silane-containing polymer (in this context pbw polymer refers only to polymer material and not to materials used to prepare the polymer or materials that are by-products of a polymerization reaction, if present);
from 0.05 to 7 (e.g., from 0.1 to 5) pbw wax,
from 0 to 10 (e.g., from 1 to 5) pbw plasticizer, and
from 0 to 10 (e.g., from 1 to 5) pbw coalescent.

Other polymer finish composition such as paints, protective wood finishes, etc., can be prepared using ingredients and amounts of ingredients that are common or well-known and useful for those functional coatings, such as by use of pigment for paints.

One particularly desirable property of a polymer composition or a polymer finish composition is stability of an emulsion, which can be achieved by polymer compositions and polymer finish comositions as described. Emulsions are considered stable if they do not separate over a determined amount of time, such as over 30 days when stored at elevated temperature (~50° to ~65° C., i.e., 125° to 150° F.).

A polymer finish composition can be used as desired, e.g., to coat a vertical or horizontal surface. For example, a floor care composition can be used as a polishing or protective agent for floors, as well as other substrates such as furniture, vehicles, building materials (e.g., windows), and the like. A floor care composition can be used to provide coatings to floors made of wood, wooden materials, synthetic resins, concrete, marble, stone and the like.

In use of a floor care composition, a floor can be coated, and thereby protected, by applying the floor care composition to a floor substrate and allowing the coating to dry in air or by heating; application of the floor care composition can be by fabric coating, brush spraying, brushing, etc., advantageously, at or about room temperature. Such coated floors can exhibit advantageous water resistance, scratch resistance, a desired degree of gloss (e.g., from semi-gloss to matte finish), and gloss retention. Additionally or optionally, the coated floor does not exhibit yellowing.

A floor care composition can be used to prepare a coated floor that has a coating (i.e., film) thickness of up to ~70 μm, commonly from ~5 to ~50 μm, and typically from ~10 to ~30 μm. Film thickness can be developed over several applications.

Certain embodiments of polymer finish compositions, such as floor care compositions, can exhibit useful or advantageously low viscosity, when measured at compounding and when measured immediately after compound, of a matter of hours or days after compounding, e.g., 10 days after compounding. Viscosity of a polymer finish composition (e.g., a floor care composition) may tend to increase after forming (e.g., "compounding") the polymer finish composition from its constituent ingredients. Advantageously, embodiments of polymer finish compositions described herein can exhibit a reduced amount of this viscosity increase, with preferred measured values being below ~60 cP, below ~50 cP, or even below ~30 cP.

Coatings of the invention (floor care coatings, paint coatings, or otherwise) can be characterized by a low haze value based the described use of polymer composition that includes polymer and silane. Alternately or in addition, coatings of the invention (floor care coatings, paint coatings, or otherwise) can be characterized by good adhesion to particular substrates, including terrazzo, granite, marble, and ceramic tile, based the described use of polymer composition that includes polymer and silane.

EXAMPLES

A polymer commonly used in the manufacture of floor polishes containing calcium ions (as a reversible crosslinker) was used alone or in combination with the following silanes to provide eight polymer compositions (Examples 1-8):

1) none (control),
2) β-(3,4-epoxycyclohexyl)ethyltriethoxysilane,
3) 3-(triisopropoxysilyl)propyl methacrylate,
4) vinyltriethoxysilane,
5) 3-glycidoxypropyl trimethoxysilane from Dow Corning,
6) 3-glycidoxypropyl trimethoxysilane from Shin-Etsu Chemical,
7) methyl(glycidoxypropyl)diethoxysilane, and
8) 3-methacryloxypropyl trimethoxysilane.

A version of the same polymer with vinyltriethoxysilane mer incorporated in the polymer backbone was used to provide an additional polymer composition (Example 9).

Each of the polymer compositions had 1.2 weight percent silane based on total polymer solids.

Each of the polymer compositions was compounded into a floor polish having 15.13 weight percent polymer, 2.00 weight percent wax, and 20.00% total solids. This was done by adding water, 1.82 weight percent fugitive plasticizer, 0.76 weight percent solvent, 2.12 weight percent permanent plasticizer, PolyFox™ PF-2002 fluorosurfactant (OMNOVA Solutions Inc.; Akron, Ohio), 37.83% of polymer composition latex and 5.71% wax emulsion. Examples 1-8 employed 51.72 weight percent water and 0.05 weight percent fluorosurfactant, while Example 9 employed 50.72 weight percent water and 1.05 weight percent fluorosurfactant.

Properties of floor care compositions 10-18 are shown below in Table 1, where + indicates an acceptable rating and − indicates an unacceptable rating. Adhesion was determined using a wet scrub methodology after soaking 15 minutes in water. Viscosity values are dynamic viscosity as measured by a Brookfield™ LV viscometer using a #1 spindle at 1 rotation per second.

TABLE 1

| Floor care composition properties | | | | | | | | | |
|---|---|---|---|---|---|---|---|---|---|
| | 10 | 11 | 12 | 13 | 14 | 15 | 16 | 17 | 18 |
| polymer | 1 | 2 | 3 | 4 | 5 | 6 | 7 | 8 | 9 |
| Viscosity (cP) | | | | | | | | | |
| Initial | 59.5 | 56.6 | 54.4 | 51.5 | 49.8 | 54.5 | 56.5 | 52.0 | 26.6 |
| 10 days | 60.0 | 64.0 | 61.5 | 46.5 | 51.5 | 62.0 | 73.5 | 52.5 | 27.0 |
| Hazing/blooming | | | | | | | | | |
| 1$^{st}$ coat | + | + | + | + | + | + | + | + | + |
| 2$^{nd}$ coat | − | − | − | + | + | − | − | − | + |
| 3$^{rd}$ coat | − | − | − | + | + | − | − | − | + |
| 4$^{th}$ coat | − | − | − | + | + | − | − | − | + |
| Adhesion | | | | | | | | | |
| Terrazzo | − | − | − | + | + | − | − | − | + |
| Granite | − | − | − | + | + | + | − | − | + |
| Marble | − | − | − | + | + | + | − | − | + |
| Ceramic | − | − | − | + | + | + | − | − | − |

That which is claimed is:

1. A floor care composition comprising:
a) a polymer comprising 10 to 50 weight percent vinyl aromatic mer, 5 to 20 weight percent ethylenically unsaturated acid mer derived from methacrylic acid, 30 to 70 weight percent methyl(meth)acrylate mer, butyl acrylate mer, or a combination thereof, and 0.1 to 1.5 weight percent silane mer comprising pendent trimethoxysilane or triethoxysilane groups, wherein said silane mer is derived from vinyltriethoxysilane or glycidoxypropyl trimethoxysilane, the polymer in an amount in the range of 70-92 weight percent solids per total weight solids in the floor care composition,
b) 0.05 to 7 parts by weight wax as solids based on total weight of the floor care composition,
c) 1 to 10 parts by weight permanent plasticizer based on total weight of the floor care composition,
d) 1 to 10 parts by weight coalescent based on total weight of the floor care composition,
e) fluorosurfactant, and
f) aqueous liquid,
said composition optionally being free of zinc; where composition has a dynamic viscosity, measured 10 days after compounding using a Brookfield LV viscometer with a #1 spindle at 1 rotation per second, of less than 100 cP.

2. The floor care composition of claim 1 comprising 0.5 to 4 parts by weight wax as solids based on total weight of the floor care composition.

3. The floor care composition of claim 1 wherein said polymer is emulsified, dispersed or suspended in said aqueous liquid.

4. The floor care composition of claim 1 wherein said polymer is in the form of solid particles.

5. The floor care composition of claim 1 comprising from 5 to 40 weight percent solids based on total weight of the floor care composition.

6. The floor care composition of claim 1 wherein said polymer further comprises polyene mer.

7. The floor care composition of claim 1 comprising from 10 to 45 parts by weight of said polymer as solids based on total weight of the floor care composition.

8. The floor care composition of claim 1 comprising from 1 to 5 parts by weight plasticizer as solids based on total weight of the floor care composition.

9. The floor care composition of claim 1 having a dynamic viscosity, measured 10 days after compounding using a Brookfield LV viscometer with a #1 spindle at 1 rotation per second, of less than 60 cP.

10. The floor care composition of claim 1 further comprising:
a polyvalent metal ion.

11. The floor care composition of claim 1 wherein the vinyl aromatic mer is derived from a vinyl aromatic monomer selected from: styrene, halogenated styrenic monomer, vinyl toluene, o-methoxy styrene, p-methoxy styrene, allyl phenyl ether, allyl tolyl ether, and α-methyl styrene.

* * * * *